Nov. 14, 1967   R. I. STITT   3,352,343
MECHANICAL CONNECTION
Filed April 7, 1966   2 Sheets-Sheet 1

INVENTOR.
ROBERT I. STITT
BY

United States Patent Office 3,352,343
Patented Nov. 14, 1967

3,352,343
MECHANICAL CONNECTION
Robert I. Stitt, El Sobrante, Calif., assignor to SCM Corporation, New York, N.Y., a corporation of New York
Filed Apr. 7, 1966, Ser. No. 540,867
2 Claims. (Cl. 151—31)

ABSTRACT OF THE DISCLOSURE

This disclosure relates to a mechanical locking screw assembly for locking the position of external threads of a dowel screw relative to the internal threads of a supporting element by the proper positioning of opposed camming chamfers.

---

This invention relates to an improved mechanical locking screw assembly for selectively locking one adjustable member relative to another.

An object of this invention is to provide a locking screw assembly which when installed will be located completely within one of the adjustable supporting members.

A further object of this invention is to provide a locking screw assembly which will utilize the same internal threads of one supporting member as is used by the other member in selecting the desired adjusted position.

A further object of this invention is to provide a locking screw assembly which will perform a dual locking function of; (1) forcing an external surface of one member transversely against an internal surface of the other member and, (2) forcing an external surface of one member longitudinally against an internal surface of the other member.

A further object of this invention is to provide a locking screw assembly which when installed will allow free oil passage therethrough.

A further object of this invention is to provide a locking screw assembly which requires a minimum torque of 8.5 inch ounces to loosen after the locking screw has been locked in place.

A still further object of this invention is to provide a locking screw assembly which is easily installed and adjusted.

A locking screw assembly, in accordance with the present invention, comprises a first adjustable member having a hole through its center, a threaded external surface portion adjacent one end, a camming surface in the form of a chamfer on the inside of the hole adjacent the threaded end and a longitudinal slot in the threaded end. The device also includes a separate locking screw with a hex hole through its center and a camming surface in the form of a chamfer on the outside edge of the locking screw. The locking screw is provided with external threads having the same diameter as the threaded end of the first adjustable part. A second adjustable part or supporting member is provided with a hole having internal threads complementary to the external threads of the first adjustable part and locking screw.

The novel features of the invention, as well as additional objects and advantages thereof, will be understood more fully from the following description when read in connection with the accompanying drawing, in which.

Referring now in more detail to the accompanying drawing, the assembly will be described with reference to a supporting shaft 1, having a dowel screw 2 adjustably locked therein and retaining a supported member 3 thereon. These parts are shown and described merely by way of illustration, as it is apparent that the assembly may be used for selectively locking a great variety of relatively movable parts.

Figure 1:
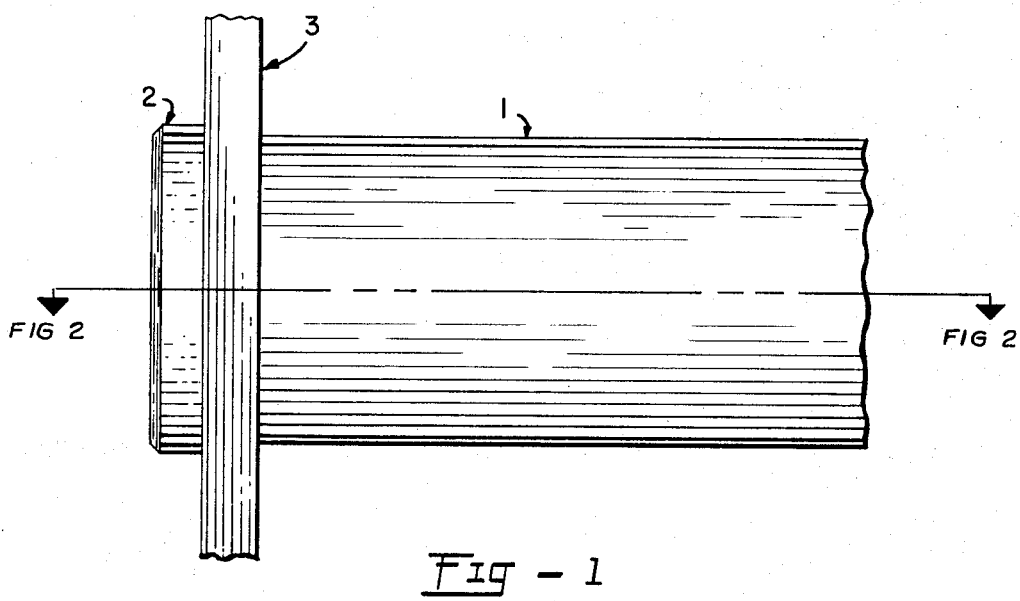
FIGURE 1 is a top view of the locking screw assembly installed to retain a supported member thereon.
Figure 2:
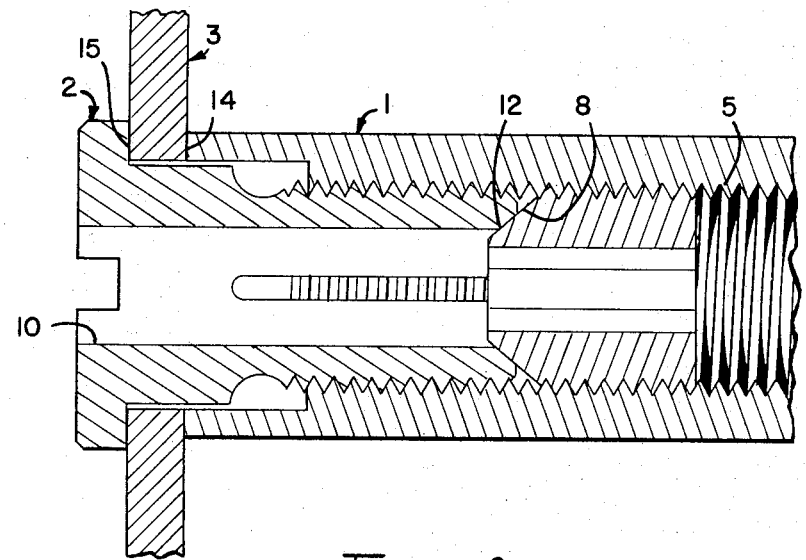
FIGURE 2 is a sectional view taken along line 2—2 of FIGURE 1.
Figure 3:
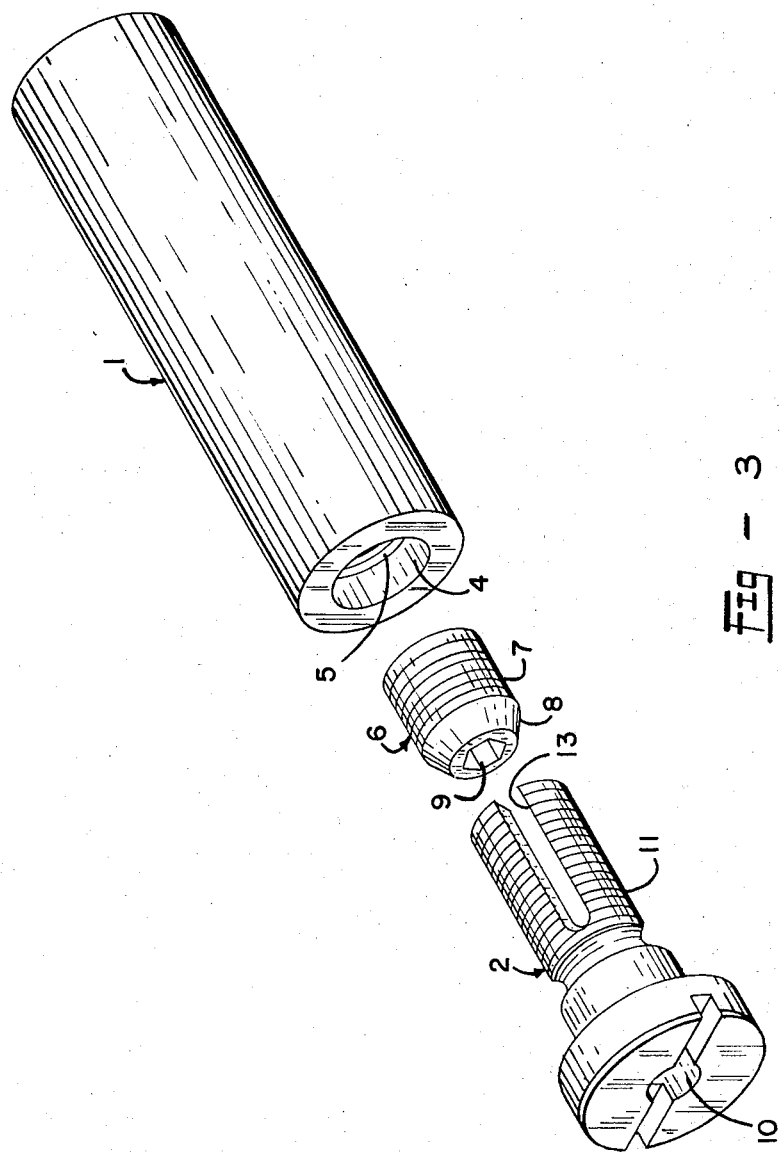
FIGURE 3 is an exploded view of the locking screw assembly.

Referring now particularly to FIGURE 3 of the drawing, the supporting shaft 1 is provided with an aperture 4 having internal threads 5 therein. The device includes a locking screw 6 provided with external threads 7, an abutment surface 8 in the form of an external camming chamfer, and a hex aperture 9 through its center. The device also includes an adjustable dowel screw 2 having an aperture 10 through its center, a threaded external portion 11 adjacent one end, an abutment surface 12 (shown in FIGURE 2) in the form of an internal camming chamfer on the inside of the aperture 10 adjacent the threaded end and a longitudinal slot 13 in the threaded end. It is to be understood that the diameter of the threaded portions of the locking screw 6 and dowel screw 2 are such that they will be complementary to the internal threaded portion 5 of the supporting shaft 1. Also, the chamfer surface 8 on the locking screw 6 is complementary to the chamfer surface 12 on the dowel screw (as shown in FIGURE 2). The aperture 10 in the dowel screw 2 must be of such a diameter that will permit a hex wrench to be inserted therethrough and to be freely rotatable therein for turning the locking screw 6.

As shown in FIGURE 2, the supporting shaft 1 and dowel screw 2 are provided with shoulder portions 14, 15 for retaining a supported member 3 therebetween. While the shoulder portions 14, 15 are shown in FIGURE 2 as abutting against the member 3, it is to be understood that to provide the necessary clearance to allow member 3 to rotate on the dowel screw would be within the scope of the invention.

In installing the locking screw assembly, the locking screw 6 is screwed, with the use of a hex wrench, well up into the shaft 1. The dowel screw 2 and the parts to be retained are positioned, the dowel screw is screwed into place and the required amount of end play is left for the retained parts. The locking screw 6 is then screwed down using a hex wrench through the aperture 10 provided in the dowel screw, so the camming surfaces 8, 12 are mated. Then the locking screw is tightened holding the dowel screw in place. Tightening the locking screw performs a dual locking function of (1) forcing the external threaded surface of the dowel screw transversely against the internal threaded surface of the supporting shaft and (2) forcing the external threaded surface of the dowel screw longitudinally against the internal threaded surface of the supporting shaft. After the dowel screw has been locked in place with the locking screw, it requires a minimum torque of 8.5 inch ounces to loosen.

The hex aperture through the locking screw and the access aperture through the dowel screw will allow free oil passage through the supporting shaft.

With the above described structure, it is apparent that the locking screw assembly is easily installed and adjusted.

It will be understood that the invention is not to be limited to the specific construction or arrangement of parts shown, but that they may be widely modified within the invention defined by the claims.

What is claimed is:
1. A mechanical locking screw assembly comprising, in combination, a supporting shaft provided with an aperture having internal threads therein, a locking screw provided with external threads threaded into said shaft aperture, an abutment surface in the form of an external camming chamfer adjacent one edge of said locking screw, an adjustable dowel screw provided with external threads complementary to the threaded aperture in said supporting shaft and having an aperture through its center, an abutment surface in the form of an internal camming chamfer on the inside of said dowel screw aperture adjacent the threaded end, said dowel screw having a longitudinal slot adjacent the threaded end, the threaded portion of said dowel screw being threaded into said supporting shaft aperture to a selected position, a hex aperture in said locking screw for receiving a hex wrench through the aperture in said dowel screw for tightening the locking screw against said dowel screw whereby the camming chamfer on said locking screw will cooperate with the camming chamfer on said dowel screw to wedge the dowel screw threads against the supporting shaft threads to lock the position of the dowel screw relative to the supporting shaft, said hex aperture passes completely through said locking screw, whereby a free oil passage will be defined by the aperture in said supporting shaft, said dowel screw and said hex aperture.

2. A locking screw assembly as defined in claim 1, in which said supporting shaft and dowel screw are provided with spaced shoulder portions for rotatably supporting a member thereon.

References Cited

UNITED STATES PATENTS

| | | | |
|---|---|---|---|
| 889,894 | 6/1908 | Berentsen | 287—53 |
| 1,389,997 | 9/1921 | Sedgwick | 85—45 |
| 1,753,154 | 4/1930 | Martus | 85—1 |
| 2,479,075 | 8/1949 | Martin | 151—31 |

EDWARD C. ALLEN, *Primary Examiner.*